United States Patent
Hoffmann et al.

(10) Patent No.: US 6,938,411 B2
(45) Date of Patent: Sep. 6, 2005

(54) METHOD FOR REMOVING NITROGEN OXIDES AND PARTICULATES FROM THE LEAN EXHAUST GAS OF AN INTERNAL COMBUSTION ENGINE AND EXHAUST GAS EMISSION SYSTEM

(75) Inventors: Michael Hoffmann, Aschaffenburg (DE); Harald Klein, Bessenbach (DE); Thomas Kreuzer, Karben (DE); Adolf Schäfer-Sindlinger, Frankfurt (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 09/850,410

(22) Filed: May 8, 2001

(65) Prior Publication Data

US 2001/0052232 A1 Dec. 20, 2001

(30) Foreign Application Priority Data

May 12, 2000 (DE) .......................... 100 23 439

(51) Int. Cl.$^7$ ................................ F01N 3/00
(52) U.S. Cl. ............................ 60/295; 60/274; 60/286; 60/301; 60/303; 60/311
(58) Field of Search .................. 60/274, 286, 295, 60/311, 301, 300, 303, 299; 55/DIG. 30

(56) References Cited

U.S. PATENT DOCUMENTS

| | | | |
|---|---|---|---|
| 5,711,149 A | * | 1/1998 | Araki ............................ 60/286 |
| 5,746,989 A | * | 5/1998 | Murachi et al. ......... 423/213.7 |
| 5,850,735 A | * | 12/1998 | Araki et al. .................... 60/286 |
| 5,974,791 A | * | 11/1999 | Hirota et al. .................. 60/286 |
| 6,233,927 B1 | * | 5/2001 | Hirota et al. .................. 60/297 |
| 6,293,096 B1 | * | 9/2001 | Khair et al. ................... 60/286 |
| 6,314,722 B1 | * | 11/2001 | Matros et al. ................. 60/286 |

FOREIGN PATENT DOCUMENTS

| | | |
|---|---|---|
| DE | 198 35 565 | 2/2000 |
| DE | 198 50 757 A1 | 2/2000 |
| EP | 0 758 713 A1 | 2/1997 |
| EP | 0 976 915 | 2/2000 |
| EP | 0 976 915 A2 | 2/2000 |

OTHER PUBLICATIONS

European Search Report issued in corresponding European Application No. EP 01 10 9983.
German language Search Report (dated May 12, 2000).

* cited by examiner

*Primary Examiner*—Thomas Denion
*Assistant Examiner*—Diem Tran
(74) *Attorney, Agent, or Firm*—Kalow & Springut LLP

(57) ABSTRACT

A method for removing nitrogen oxides and particulate matter from the lean exhaust gas of a combustion engine that also contains low concentrations of sulfur oxides. The exhaust gas stream is passed over a nitrogen oxide storage catalyst and a particulate filter, where nitrogen oxides and sulfur oxides are adsorbed by the storage catalyst under lean exhaust gas conditions and the particulate matter is deposited on the particulate filter. The storage catalyst is in a first cycle is periodically denitrated by enriching the exhaust gas regeneration of the particulate filter. Desulfurization of the nitrogen oxide storage catalyst is carried out in a second cycle by raising the temperature of the lean exhaust gas to a value at which the particulate matter combustion on the particulate filter is initiated and then the storage catalyst can be desulfurized by enriching the exhaust gas.

9 Claims, 3 Drawing Sheets

METHOD FOR REMOVING NITROGEN OXIDES AND PARTICULATES FROM THE LEAN EXHAUST GAS OF AN INTERNAL COMBUSTION ENGINE AND EXHAUST GAS EMISSION SYSTEM

The present invention relates to a method for removing nitrogen oxides and particulates matter from the lean exhaust gas of a combustion engine that also contains small concentrations of sulfur oxides.

Combustion engines with lean exhaust gas are diesel engines and gasoline engines operated with lean air/fuel mixtures, the so-called lean engines. Important pollutants in the exhaust gas of these engines include carbon monoxide CO, unburned hydrocarbons HC, nitrogen oxides NOx and particulate matter, as well as sulfur oxides SOx that come from the sulfur in the fuel and lubricating oils. In contrast to the exhaust gas of stoichiometrically operated gasoline engines, this exhaust gas contains a high percentage of oxygen. The air ratio $\lambda$ in the exhaust gas of these engines is usually in the range between 1.3 and 2.

The air ratio $\lambda$ is the air/fuel ratio normalized to stoichiometric conditions. The air/fuel ratio indicates how many kilograms of air are needed for complete combustion of one kilogram of fuel. With conventional fuels the stoichiometric air/fuel ratio has a value of 14.6, which corresponds to an air ratio of 1. The air ratio of the exhaust gas emitted by a combustion engine corresponds to the air ratio of the air/fuel mixture supplied to the engine. Exhaust gases with air ratios over 1 are called lean and exhaust gases with air ratios below 1 are called rich.

The following explanations refer to diesel engines. However, it is clear to the person skilled in the art that the method that is described can also be used with equal success to remove nitrogen oxides and particulates from the exhaust gases of lean engines.

The oxidizable components in the lean exhaust gas of diesel engines can, because of its high oxygen content, be removed very efficiently with the help of the so called oxidation catalysts, or diesel oxidation catalysts. In contrast, the removal of the nitrogen oxides in lean exhaust gas presents great difficulties. Also, the removal of the particulate matter from the exhaust gas is still not always satisfactorily solved.

The limits for diesel vehicles planned for the year 2005 in the European Union aim for a simultaneous reduction of nitrogen oxides and particulate emissions. The planned limits for vehicles with a gross vehicle weight rating over 2.5 tons are 0.25 g/km for nitrogen oxides (NOx) and 0.025 g/km for particulates. Design measures on the diesel engine can reduce only one of the two pollutant components, while at the same time increasing the level of the other one.

For example, particulate emissions can be reduced by optimizing combustion. However, the higher combustion temperatures needed for this lead to increased formation of nitrogen oxides. For their part, the nitrogen oxides can be reduced by measures like exhaust gas recirculation (EGR), which again, however, increases the emission of particulate matter. The current state of development of diesel engines for the said range of applications represents an optimum with respect to the emission of nitrogen oxides and particulate matter. The emission of the nitrogen oxides in the partial throttle range for these engines is 100 ppm by volume, while the emission of particulates is about 0.5 g/km. The attempt to reduce one of the two components further by measures involving the engine automatically leads to increased emission of the other pollutant component.

The planned exhaust limits can thus only be met by suitable exhaust gas aftertreatment. Mainly particulate filters are used to reduce the emission of carbon at the present time. The so-called wall flow filters, which are similar in construction to the well known catalyst substrates in honeycomb form, are very common for this purpose. In the wallflow filters alternate passages for the exhaust gas that run through the honeycomb are closed, so that the exhaust gas has to pass through the porous walls of the filter. Such wall flow filters filter up to 95% of the particulate matter from the exhaust gas.

The flow resistance of the filter increases with increasing particulate load. For this reason, the filters have to be regenerated by combustion of the particulate matter. The currently conventional methods for regeneration of particulate filters employ thermal or catalytic processes or even fuel additives for continuous or cyclic regeneration of the particulate filters. Temperatures above 600° C. are needed for thermal combustion of the particulate matter. The ignition temperature of the particulate matter can be lowered to about 450° C. by catalytically coating the filter or by appropriate additives to the fuel.

For instance, DE 34 07 172 C2 describes a device for cleaning the exhaust gases of diesel engines that contains filter elements in one housing or spaced apart in succession, where at least one filter element A has a coating that reduces the ignition temperature of the particulate matter and at least one filter element B has a catalyst that promotes the combustion of gaseous pollutants, and there are several alternating filter elements A and B.

EP 0 341 832 B1 describes a method for treating the exhaust gas of heavy-duty trucks. The exhaust gas is first passed over a catalyst without filters in order to oxidize the nitrogen monoxide in it to nitrogen dioxide. The nitrogen dioxide-containing exhaust gas is then used for combustion of particulate matter deposited on a filter connected in line, where the amount of the nitrogen oxide is sufficient to conduct the combustion of particulates deposited on the filter at a temperature of less than 400° C.

EP 0 835 684 A2 describes a method for treating the exhaust gas of light trucks and passenger cars. In accordance with this method, the exhaust gas is passed over two successively connected catalysts, of which the first oxidizes the nitrogen monoxide in the exhaust to nitrogen dioxide, which in turn oxidizes the particulates deposited on the second catalyst to $CO_2$, and the nitrogen dioxide is reduced to nitrogen according to the following equation:

$$2NO_2 + 2C \rightarrow 2CO_2 + N_2 \qquad (1)$$

WO 99/09307 describes a method for reducing particulate emissions of heavy trucks. In accordance with this method, the exhaust gas is first passed over a catalyst for oxidation of monoxide to carbon dioxide and then over a particulate filter, on which the deposited particulate matter is continuously oxidized. A part of the purified exhaust gas is passed through a cooler and then mixed into the intake air of the diesel engine.

A prerequisite for the flawless functioning of the latter methods is the presence of a sufficient amount of nitrogen dioxide, so that combustion of the particulate matter in the exhaust gas can progress in accordance with equation (1) as completely as possible. For this, nitrogen dioxide is generated by oxidation of nitrogen monoxide to nitrogen dioxide with the aid of an oxidation catalyst, which can lead to unintended emissions of nitrogen dioxide.

The so-called nitrogen storage catalysts were developed to reduce nitrogen oxides in the lean exhaust gas of internal combustion engines. The functioning and composition of nitrogen oxide storage catalysts are known, for example, from EP 0 560 991 B1. These catalysts contain at least one component from the group of the alkali metals (for example, potassium, sodium, lithium, cesium), the alkaline earth metals (for example, barium, calcium) or the rare earth metals (for example lanthanum, yttrium) as storage material. The storage catalyst contains platinum as the catalytically active element. Under oxidizing exhaust gas conditions, i.e., in lean operation, the storage materials are able to store the oxygen oxides contained in the exhaust gas in the form of nitrates. However, it is necessary for this that the nitrogen oxides, which consist of from about 60 to 95% nitrogen oxide according to the type of engine and its mode of operation, first be oxidized to nitrogen dioxide. This takes place on the platinum component of the storage catalysts.

Since the storage capacity of the storage catalyst is limited, it has to be regenerated from time to time. In order to differentiate the operation of the regeneration of the nitrogen oxide storage catalyst from the regeneration of the particulate filter unambiguously, the regeneration of the nitrogen oxide storage catalyst will be called "denitration" within the scope of this invention. For denitration of the nitrogen oxide storage catalyst the air ratio of the air/fuel mixture supplied to the engine and thus the air ratio of the exhaust gas leaving the engine is briefly reduced to values under 1. This is also called enrichment of the air/fuel mixture or the exhaust gas. Reducing conditions are thus present in the exhaust gas at the entrance to the storage catalysts during this brief operating phase.

Under the reducing conditions during the enrichment phase the nitrogen oxides stored in the form of nitrates are released back (desorbed) and reduced to nitrogen use thru on the storage catalyst with simultaneous oxidation of carbon monoxide, hydrocarbons and water, as with conventional three-way catalysts.

An important problem in the use of nitrogen oxide storage catalysts is the sulfur content of the fuel. It is chiefly emitted in the form of sulfur dioxide from an internal combustion engine. Sulfur dioxide acts as a catalyst poison for conventional three-way catalysts and especially for nitrogen oxide storage catalysts. Poisoning by sulfur leads to reduction of pollutant conversion and to rapid aging of the catalyst in the case of three-way catalysts. In general, the poisoning of the three-way catalysts is largely reversible. The sulfur components of the exhaust gas are present on the three-way catalyst in the form of sulfates. Regeneration of the catalyst takes place in the normal operating range, during driving phases with high exhaust gas temperatures and slightly reducing exhaust gas. Under these conditions the sulfates are reduced and the sulfur is emitted in the form of sulfur dioxide or hydrogen sulfide. This operation is called desulfurization within the scope of this invention. The emission of hydrogen sulfide during desulfurization can be suppressed to a large degree by certain measures at the catalyst and engine adjustments.

Poisoning of a nitrogen oxide storage catalyst by sulfur oxides in principle occurs in the same way as the deposition of the nitrogen oxides. The sulfur dioxide emitted by the engine is oxidized to sulfur trioxide on the catalytically active noble metal component of the storage catalyst. Sulfur trioxide reacts with the storage materials of the storage catalyst with the formation of the corresponding sulfates. Here it is particularly disadvantageous that the absorption of sulfur trioxide is preferred over the adsorption of nitrogen oxides, and the sulfates that form are thermally very stable. Thus, a clear reduction of the nitrogen oxide storage capacity of the catalyst results from the poisoning by sulfur oxides, which because of the high thermal stability of the sulfates in the storage materials is reversible only at high exhaust gas temperatures around 600° C., even under reducing exhaust gas conditions. The rate of desorption of the sulfur oxides is dependent on the storage material, the exhaust gas temperature and the degree of enrichment of the exhaust gas. The desorption rate increases with increasing temperature. When the term desulfurization temperature is used below, it means the temperature at which the relevant storage material can be freed of sulfur compounds within a measured time of 1 to 20 minutes in rich exhaust gas.

DE 198 13 654 A1 describes the method for operating an exhaust gas ignition control system that contains a sulfur trap and a nitrogen oxide storage catalyst. For desulfurization of the sulfur trap the exhaust gas temperature is first elevated to 640° C. with a lean exhaust gas. After reducing the air ratio to values below 1 the desorption of the sulfur begins. The emitted sulfur compound is dependent on the selected air ratio. At an air ratio of 0.98, i.e., at only slight enrichment, the sulfur is desorbed almost exclusively in the form of sulfur dioxide. The time of the desulfurization here is about 2 to 3 minutes. If the air ratio is reduced even more significantly during the desulfurization, the time needed for the desulfurization also decreases. However, with increasing enrichment of the exhaust gas the sulfur is desorbed increasingly more in the form of hydrogen sulfide. At an air ratio of 0.75 the time of the desulfurization is only 1.5 minutes. However, in this case the sulfur is released almost exclusively in the form of hydrogen sulfide.

An object of this invention is to provide a method for removing nitrogen oxides and particulate matter from lean exhaust gas of an internal combustion engine that also contains sulfur oxides, where the particulate matter is deposited on a particulate filter and the particulate filter is regenerated cyclically by burning out the particulates, without involving the hazard of elevated emission of nitrogen dioxide in the regeneration of the particulate filter.

Another object of the present invention is to create a device for operation of the method.

SUMMARY OF THE INVENTION

The above and other objects of the present invention can be achieved by a method comprising in a first cycle, passing the exhaust gas stream over a nitrogen oxide storage catalyst and a particulate filter, and adsorbing nitrogen oxides and sulfur oxides by the storage catalyst under lean exhaust gas conditions, depositing the particulates on the particulate filter, and periodically denitrating the storage catalyst by enriching the exhaust gas. Then, in a second cycle, regenerating the particulate filter and desulfurizing the nitrogen oxide storage catalysts by increasing the temperature of the lean exhaust gas to a level at which the combustion of particulates on the particulate filter is initiated and accordingly, desulfurizing the storage catalyst by enriching the exhaust gas.

The method of the invention thus has two cycles. In the first cycle, the nitrogen oxides and sulfur oxides contained in the exhaust gas are stored on the storage catalyst in the form of nitrates and sulfates under lean exhaust gas conditions and the storage catalyst is denitrated under rich exhaust gas conditions after depletion of its nitrogen oxide storage capacity. The particulate matter of the exhaust gas is deposited on the particulate filter at the same time as the storage as the nitrogen oxides and sulfur oxides. This first cycle consisting of storage and denitration is relatively short in time. The total length is between 0.5 and 20 minutes, while the length of the denitration requires only between 1 and 20 seconds.

For denitration of the storage catalyst, the exhaust gas is enriched, i.e., the air ratio of the exhaust gas is reduced to a value under 1, preferably a value between 0.7 and 0.98, by increasing the hydrocarbon content of the exhaust gas. In modern diesel engines this can take place either by the appropriate change of the air/fuel mixture or by separate feed of fuel into the exhaust gas stream shortly before the nitrogen oxide storage catalyst. Under the reducing exhaust gas conditions that prevail during denitration, the nitrogen oxides stored on the storage catalyst in the form of nitrates are desorbed and reduced to nitrogen on the storage catalyst using hydrocarbons and carbon monoxide as reducing agents. The denitration of the storage catalyst takes place at its normal operating temperature. An increase of temperature is not necessary for this operation.

In the second cycle of the method the particulate filter is regenerated and the oxide storage catalyst is desulfurized. The deposition of the particulate matter contained in the exhaust gas onto the particulate filter causes a continuous increase of its exhaust gas back pressure, so that the particulate filter, too, has to be regenerated cyclically by burning out the particulate matter. Temperatures between 400 and 650° C. are necessary to ignite the burning of the particulate matter, in each case according to the whether the particulate filter is or is not provided with a particulate ignition coating. According to experience, the particulate filter has to be regenerated about every 1000 km of driving. Thus, the second cycle is, as a rule, considerably longer than the first cycle of the method.

For regeneration of the particulate filter and desulfurization of the nitrogen oxide storage catalyst the exhaust gas temperature with lean exhaust gas is raised to a value at which particulate combustion on the particulate filter is initiated and then the storage catalyst can be desulfurized by enrichment of the exhaust gas. The temperature necessary for this is dependent on the choice of material for the nitrogen oxide storage catalyst and on a particulate ignition coating that may be on the particulate filter. In general, the desulfurization temperature of the storage catalyst is higher than the ignition temperature of the particulate matter on the particulate filter. In particular cases these relationships can be the other way around. In addition, the exhaust gas temperature needed for regeneration of the particulate filter and for the desulfurization of the storage catalyst is also influenced by temperature difference that may exist between the storage catalyst and the particulate filter, which is caused by losses of heat by the exhaust gas through the exhaust gas pipe between the storage catalyst and the particulate filter.

During the described denitration of the storage catalyst, the sulfur oxides stored in the form of sulfates are not released and thus continuously degrade the maximum storage capacity for nitrogen oxides. As a rule, however, the sulfur oxide content of the exhaust gas is considerably lower than the nitrogen oxide content, so that a noticeable adverse effect on storage capacity for nitrogen oxides does not take place until after lengthy operation of the diesel engine and only then must desulfurization be carried out. The desulfurization differs from denitration in that, because of the high stability of the stored sulfates, it can take place only at a higher temperature, i.e., the temperature of the storage catalyst has to be raised for this purpose.

Like the denitration of the storage catalyst, desulfurization thereof must be carried out cyclically. The cycle length for the denitration is between 0.5 and 20 minutes, as indicated above. In return, the storage catalyst has to be desulfurized only about every 1000 to 10000 km of driving, depending on the sulfur content of the fuel, but, when using materials that can be very easily desulfurized, it can be favorable to carry out the desulfurization considerably more frequently, for example, every 100 to 250 km.

In accordance with the embodiment of the method described here, the desulfurization of the storage catalyst and regeneration of the particulate filter are coupled to each other. After ignition of particulate combustion the air ratio is reduced to values between 0.7 and 0.98 by increased feed of hydrocarbons and in this way, the desulfurization of the storage catalyst is initiated. Thus in accordance with the invention, the storage catalyst is also desulfurized with each regeneration of the particulate filter.

In a specific embodiment of this variation of the method of the invention, the nitrogen oxide storage catalyst is arranged in the exhaust gas stream in front of the particulate filter; i.e. upstream thereof. The exhaust gas temperature is raised by burning hydrocarbons on the storage catalyst. The hydrocarbons needed for this are supplied to the exhaust gas stream by after-injection of fuel into the combustion chambers of the combustion engine or are injected into the exhaust gas stream before the storage capacitor using an injection nozzle while maintaining the net oxidizing exhaust gas composition. After ignition of particulate combustion, the combustion engine is operated with a rich air/fuel mixture to produce a reducing exhaust gas composition for the desulfurization of the storage catalyst.

In a second embodiment of the method of the invention, the nitrogen storage catalyst and the particulate filter are arranged in succession in the exhaust gas stream. An additional oxidation catalyst is inserted into the exhaust gas stream in front of the particulate filter but behind the nitroaen storage catalyst. The exhaust gas temperature for regeneration of the particulate filter and desulfurization of the storage catalyst is increased by burning hydrocarbons on the oxidation catalyst, for which the required hydrocarbons are added to the exhaust gas stream by after-injection of fuel into the combustion chambers of the diesel engine or are injected into the exhaust gas stream by means of an injection nozzle in front of the oxidation catalyst, while maintaining a net oxidizing exhaust gas composition. After ignition of particulate combustion on the particulate filter, the combustion engine is operated at a rich air/fuel mixture to generate a reducing exhaust gas composition for the desulfurization of the storage catalyst. Alternatively, hydrocarbons can be injected into the exhaust gas stream between the particulate filter and the storage catalyst. In accordance with this embodiment of the method as well, the desulfurization of the storage catalyst and the regeneration of the particulate filter are coupled to each other.

In a simplified embodiment of the method that requires only one structural component, the nitrogen oxide storage catalyst is arranged in the form of a coating on the inlet side and on the outlet side of the particulate filter. The coating on the inlet side of the particulate filter can also be replaced by a particulate ignition coating or by a coating with an oxidation catalyst.

In a third embodiment of the method of the invention, the coupling between desulfurization of the storage catalyst and regeneration of the particulate filter is broken in order to protect the storage catalyst against frequent thermal stress. As was already noted, the particulate filter as a rule has to be regenerated more frequently than it is necessary to desulfurize the storage catalyst. For this reason it is desirable to be able to regenerate the particulate filter independent of desulfurization of the storage catalyst. For this, the lean exhaust gas stream is successively passed over a nitrogen oxide storage catalyst and a particulate filter. In addition to the first and second cycles already described, in a third cycle only the regeneration of the particulate filter is carried out with a lean exhaust gas composition by raising the exhaust gas temperature in front of the particulate filter beyond the particulate ignition temperature.

The first and second cycles are carried out as with the variations described above. For the regeneration of the particulate filter in the third cycle, there is the possibility of raising the exhaust gas temperature beyond the storage catalyst and in front of the particulate filter to the necessary particulate ignition temperature by burning hydrocarbons on an oxidation catalyst connected into the exhaust gas stream in front of the particulate filter. The oxidation catalyst can also be applied in the form of a coating to the inlet side of the particulate filter.

The hydrocarbons can be injected into the exhaust gas stream by means of a nozzle in front of the oxidation catalyst while maintaining a net oxidizing exhaust gas composition. Alternatively, there is the possibility of making the necessary hydrocarbons available by after-injection into the combustion chambers of the combustion engine. In this case, the exhaust gas stream must no longer pass through the storage catalyst, but rather must bypass it. This can be implemented by an appropriate arrangement of exhaust gas valves and bypass piping.

In contrast to the known methods for regeneration of a particulate filter using nitrogen dioxide, in this invention the nitrogen oxides are adsorbed on the nitrogen oxide storage catalyst arranged in front of the particulate filter. In this case, the nitrogen monoxide that is contained in the exhaust gas is indeed initially oxidized to nitrogen dioxide, according to recognized theories of the functioning of a nitrogen oxide storage catalyst. However, the nitrogen dioxide is immediately stored on the storage catalyst in the form of nitrates, so that no significant amounts of nitrogen dioxide leave the catalyst.

BRIEF DESCRIPTION OF DRAWINGS

The present invention will be further understood with references to the accompanying drawings, wherein.

DETAILED DESCRIPTION OF THE INVENTION

The present invention will now be described in further detail with reference to the drawings.

Figure 6:
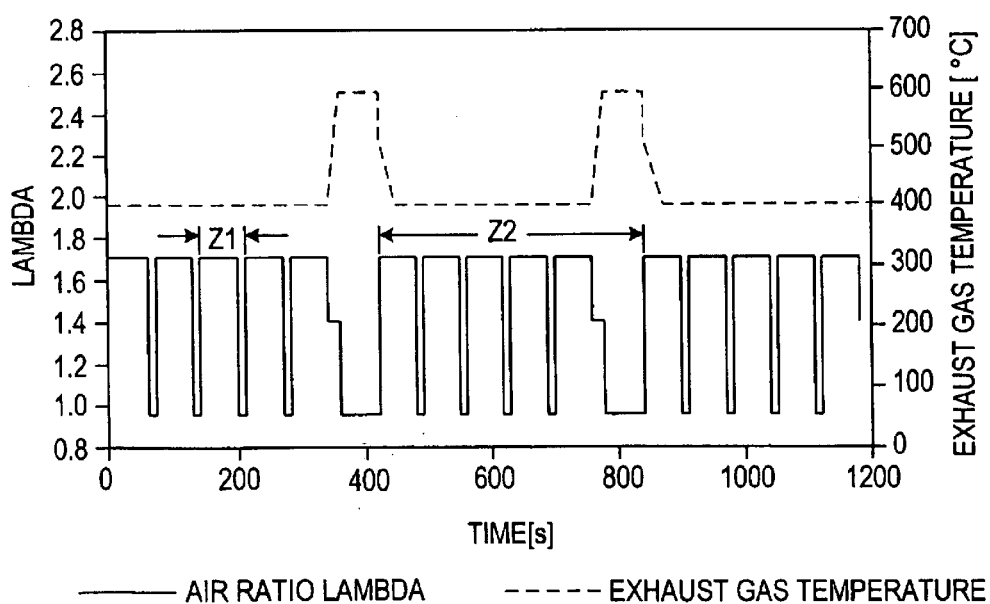
FIG. 6 is a schematic diagram of an schematic representation of the change of the air ratio and exhaust gas temperature in accordance with the method of the invention.

FIG. 6 is a schematic representation of the change of the air ratio and exhaust gas temperature during the method with the two overlapping cycles Z1 and Z2. Z1 means the first cycle of the process of storage and release of nitrogen oxides on the storage catalyst. Z2 designates the generally longer second cycle of the process of separating the particulate matter from the exhaust gas with the aid of the particulate filter and regeneration of the particulate filter with simultaneous desulfurization of the storage catalyst.

The numerical data in FIG. 6 are only given as examples and are not in any way intended to limit the method defined by the patent claims.

In FIG. 6 it is assumed that the internal combustion engine is operated at an air ratio $\lambda$ of 1.7 and constant load. The exhaust gas temperature in this state is, for example, 400° C. During operation at this air ratio the nitrogen oxides contained in the exhaust gas are stored on the storage capacitor in the form of nitrates of the storage material. After a few minutes the storage capacity of the catalyst for nitrogen oxides has become depleted and it has to be denitrated. This takes place by reducing the air ratio to a value under 1. In FIG. 6 the value 0.95 was selected. Under the reducing exhaust gas composition that then prevails, the stored nitrates are decomposed within a few seconds and converted to nitrogen, water and carbon dioxide at the storage capacitor with the help of the reducing exhaust gas components. Then the air ratio is returned to the normal value of 1.7 and the storage of the nitrogen oxide begins anew. With the increase of the air ratio to the normal value the first cycle of the process is ended. In FIG. 6 the first cycle is designated as Z1. During the entire cycle Z1 the exhaust gas temperature varies only negligibly while the load of the internal combustion engine is constant.

The enrichment of the exhaust gas to air ratios below 1 preferably takes place by operating the internal combustion engine at a rich air/fuel mixture. Such an operating state is briefly possible even with modem diesel engines. The additional enrichment of a lean exhaust gas to air ratios less than 1 would undesirably increase the fuel consumption of the vehicle and unintentionally increase the exhaust gas temperature through the additional combustion of hydrocarbons at the storage catalyst.

The course of the first cycle is controlled by the engine control system using appropriate sensors. For instance, the denitration can be initiated by the signal of a nitrogen oxide sensor that reports when a certain concentration of oxygen oxides in the exhaust gas beyond the nitrogen oxide storage catalyst has been exceeded. $\lambda$ probes can also be used for supervision of the first cycle. In the idealized representation of FIG. 6 the cycle Z1 has a constant cycle length. In real operation, however, the cycle length changes in dependence on the operating status of the internal combustion engine.

After about 1000 km of driving the particulate filter has to be regenerated because of an excess of increase of the exhaust gas back pressure. The exact time can, for example, be determined by measuring the exhaust gas back pressure in front of the particulate filter and reporting it to the engine control system. To regenerate the particulate filter, the exhaust gas temperature has to be raised from 400 to about 600° C. For this purpose hydrocarbons can be injected into the lean exhaust gas after it leaves the engine, while maintaining a net oxidizing gas composition, and burned at the storage catalyst. The air ratio of the exhaust gas is reduced in this way, for example, to a value of 1.4. Alternatively, the air ratio can also be reduced to the desired value by after-injection of fuel into the combustion chambers of the internal combustion engine.

Particulate combustion on the filter is initiated when an exhaust gas temperature of about 600° C. (depending on the presence of a catalytic coating on the particulate filter), then proceeds very rapidly. After ignition of particulate combustion, the air ratio of the exhaust gas is reduced to values under 1 in order to desulfatize the storage catalyst at the exhaust gas temperatures, which are now high. The reduction of the air ratio to values under 1 preferably takes place again by operating the internal combustion engine with a rich air/fuel mixture. After desulfurization of the storage catalyst the air ratio is raised back to the normal value and operation of the engine with cycle 1 is continued. The second cycle of the process Z2 concludes when the exhaust gas back pressure again crosses a permissible level and the regeneration of the particulate filter has to begin anew.

FIGS. 1 to 5 show different exhaust gas emission control devices suitable for the method. In the figures there are depicted the combustion engine (1), its exhaust gas pipe (2), a nitrogen oxide storage catalyst (3), a particulate filter (4), a device for feed of fuel (5) the electronic motor control (6), a sensor for measuring the exhaust gas back pressure in front of the particulate filter (7) and a nitrogen oxide sensor (8) beyond the exhaust gas emissions control device.

In each case there is a unit (9) for injection of hydrocarbons into the exhaust pipe. It can be used to enrich the lean exhaust gas with hydrocarbons while maintaining a net oxidizing exhaust gas composition.

Figure 1:
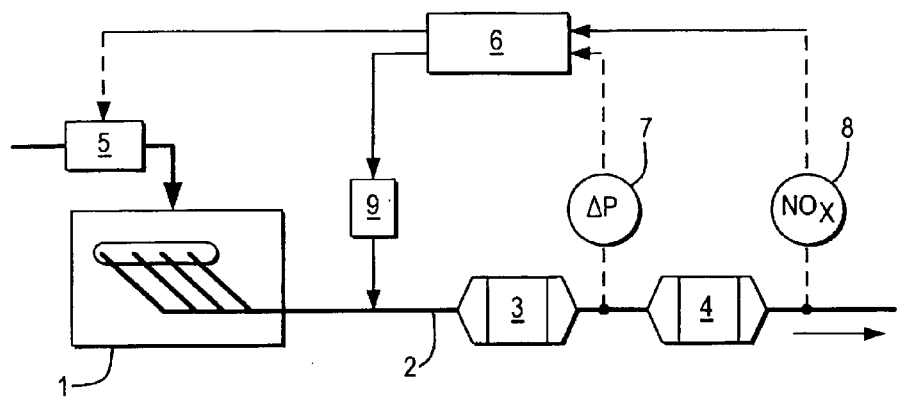
FIG. 1 is a schematic diagram of an exhaust gas emission control device for conducting one embodiment of the invention.

FIG. 1 shows a device for conducting the method in accordance one embodiment of the invention. The injection device (9) is optional in FIG. 1, since the temperature of the exhaust gas can be increased either by separate injection of hydrocarbons into the exhaust pipe in front of the storage catalyst or by after-injection of fuel into the combustion chambers of the internal combustion engine.

Figure 2:
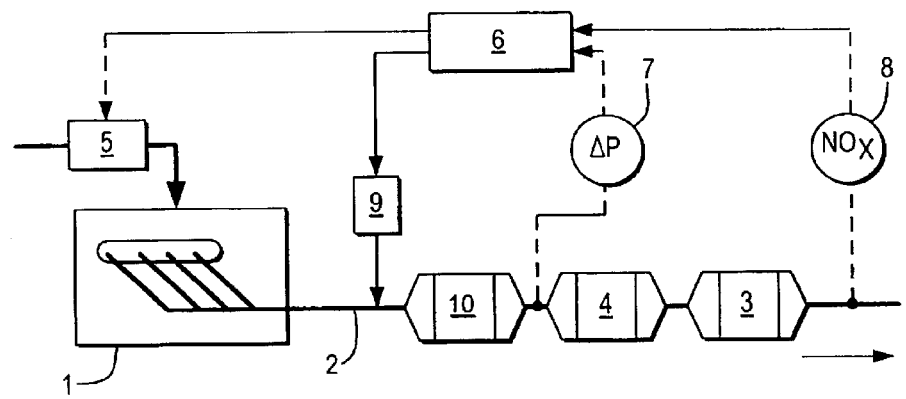
FIG. 2 is a schematic diagram of an exhaust gas emission control device for conducting a second embodiment of the invention.

The arrangement of FIG. 2 is suitable for conducting a second embodiment of the method in accordance with the invention. The nitrogen oxide storage catalyst here is arranged after the particulate filter. Now there is an oxidation catalyst (10) in front of the particulate filter, on which the hydrocarbons are burned to increase the exhaust gas temperature for regeneration of the particulate filter.

Figure 3:
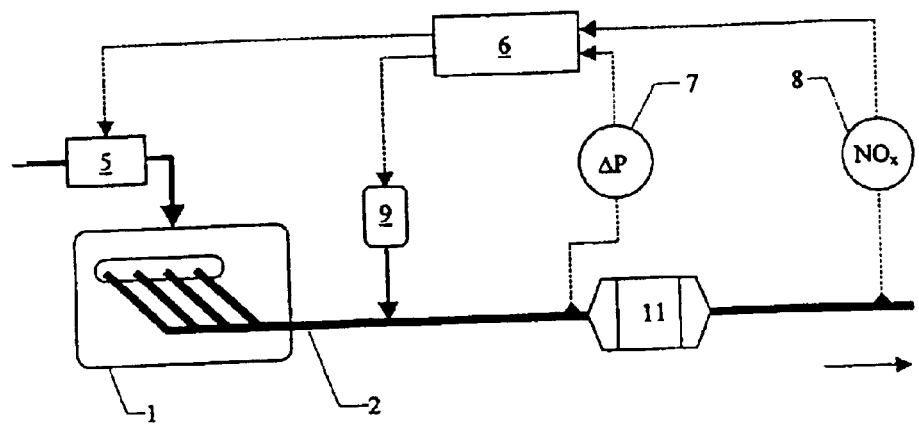
FIG. 3 is a schematic diagram of an exhaust gas emission control device for conducting conducting a third embodiment of the invention.

The arrangement of FIG. 3 is suitable for conducting the process in accordance with a third embodiment. It illustrates a coated particulate filter (11) that is either coated on the inlet and outlet sides with a nitrogen oxide storage catalyst or that has a particulate ignition coating on the inlet side and the nitrogen oxides storage catalyst on the outlet side. As another alternative the particulate filter can be provided on the inlet side with an oxidation catalyst and on the outlet side with the nitrogen oxide storage catalyst.

Figure 4:
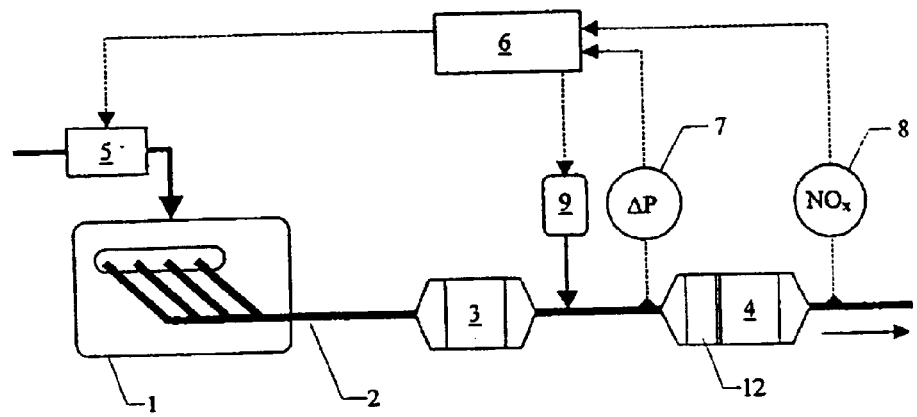
FIG. 4 is a schematic diagram of an exhaust gas emission control device for conducting conducting a fourth embodiment of the invention.

FIG. 4 shows an arrangement for conducting a fourth embodiment of the invention. In this embodiment an oxidation catalyst (12) is connected in the exhaust gas stream immediately in front of the particulate filter. There is also the possibility of applying this oxidation catalyst as a coating on the inlet side of the particulate filter.

Figure 5:
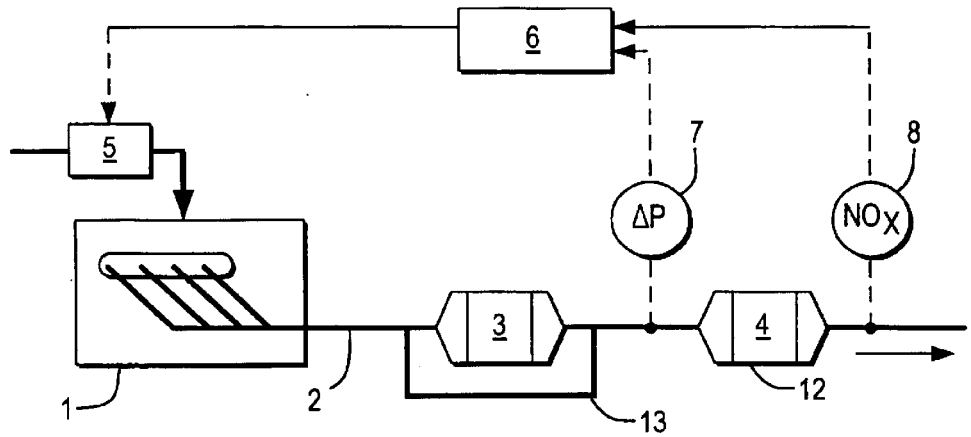
FIG. 5 is a schematic diagram of an exhaust gas emission control device for conducting conducting a fifth embodiment of the invention.

FIG. 5 shows an arrangement for conducting a fifth embodiment of the invention. In this embodiment, a bypass (13) can carry the exhaust around the storage capacity by switching the appropriate exhaust gas valves, to enable regeneration of the particulate filter without heating the storage catalyst.

Further variations and modifications of the foregoing will be apparent to those skilled in the art and are intended to be encompassed by the claims appended hereto.

German priority application 100 23 439.9 is relied on and incorporated herein by reference.

We claim:

1. A method for removing nitrogen oxides and particulate matter from the lean exhaust gas of a combustion engine that also contains low concentrations of sulfur oxides, comprising in a first cycle, passing the exhaust gas stream over a nitrogen oxide storage catalyst and a particulate filter arranged in succession, where nitrogen oxides and sulfur oxides are adsorbed by the storage catalyst under lean exhaust gas conditions and the particulate matter is deposited on the particulate filter, and periodically denitrating the storage catalyst by enriching the exhaust gas and in a second cycle at first regenerating the particulate filter by increasing the temperature of the lean exhaust gas to a value at which the particulate combustion on the particulate filter is ignited and thereafter desulfurizing the nitrogen oxide storage catalysts by enriching the exhaust gas; wherein the temperature of the lean exhaust gas is increased by burning hydrocarbons on the nitrogen oxide storage catalyst.

2. The method according to claim 1, wherein the hydrocarbons are supplied to the nitrogen oxide storage catalyst by the addition of the hydrocarbons to the exhaust gas stream.

3. The method of claim 1, further comprising passing the exhaust gas stream over an oxidation catalyst after passing the exhaust gas stream over the nitrogen oxide storage catalyst.

4. The method according to claim 1, further comprising arranging the nitrogen oxide storage catalyst in the exhaust gas stream in front of the particulate filter and wherein increasing the exhaust gas temperature, is by adding hydrocarbons to the exhaust gas stream by after-injection of fuel into the combustion chambers of the internal combustion engine or by injection into the exhaust gas stream in front of the storage catalyst with the aid of an injection nozzle, while maintaining a net oxidizing gas composition, and after ignition of particulate combustion operating the combustion engine with a rich air/fuel mixture to generate a reducing exhaust gas composition for the desulfurization of the storage catalyst.

5. The method according to claim 4, wherein the desulfurization of the storage catalyst is carried out at an exhaust gas air/fuel ratio of 0.7 to 0.98.

6. The method according to claim 1, wherein the nitrogen oxide storage catalyst is applied in the form of a coating onto the inlet side and onto the outlet side of the particulate filter.

7. The method according to claim 1, further comprising passing the exhaust gas stream successively over a nitrogen storage catalyst and particulate filter and in a third cycle carrying out only the regeneration of the particulate filter at a lean exhaust gas composition by increasing the exhaust gas temperature in front of the particular filter beyond the particulate ignition temperature.

8. The method according to claim 7, wherein an oxidation catalyst is arranged in the exhaust gas stream in front of the particulate filter and in a third cycle injecting hydrocarbons into the exhaust gas stream to increase gas temperature in front of the particulate filter while maintaining a net oxidizing exhaust gas composition in front of the oxidation catalyst and burning the hydrocarbons on the oxidation catalyst.

9. A method according to claim 8, wherein an oxidation catalyst is arranged in the exhaust gas stream in front of the particulate filter and in a third cycle adding hydrocarbons to the exhaust gas stream by after-injection of fuel into the combustion chambers of the diesel engine in order to increase the exhaust gas temperature in front of the particulate filter, while maintaining a net oxidizing exhaust gas composition, and the exhaust gas composed in this is diverted at the storage catalyst and sent to the oxidation catalyst.

* * * * *